(12) United States Patent
Li et al.

(10) Patent No.: US 10,567,186 B2
(45) Date of Patent: Feb. 18, 2020

(54) MULTICAST RELIABILITY ENHANCEMENT

(71) Applicant: Apple Inc., Cupertino, CA (US)

(72) Inventors: Guoqing Li, Cupertino, CA (US);
Joonsuk Kim, Saratoga, CA (US);
Chiu Ngok E. Wong, San Jose, CA (US); Yong Liu, Campbell, CA (US);
Su Khiong Yong, Palo Alto, CA (US);
Christiaan A. Hartman, San Jose, CA (US); Syed Aon Mujtaba, Santa Clara, CA (US); Ye Sun, Cupertino, CA (US);
Shu Du, San Jose, CA (US); Wen Zhao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 411 days.

(21) Appl. No.: 15/137,870

(22) Filed: Apr. 25, 2016

(65) Prior Publication Data

US 2016/0315782 A1   Oct. 27, 2016

Related U.S. Application Data

(60) Provisional application No. 62/153,287, filed on Apr. 27, 2015.

(51) Int. Cl.
*H04W 4/06* (2009.01)
*H04L 12/18* (2006.01)
*H04B 7/0452* (2017.01)
*H04W 84/12* (2009.01)

(52) U.S. Cl.
CPC ....... *H04L 12/1886* (2013.01); *H04B 7/0452* (2013.01); *H04L 12/185* (2013.01); *H04L 12/189* (2013.01); *H04W 84/12* (2013.01)

(58) Field of Classification Search
CPC ..... H04L 12/1886; H04L 1/00; H04L 1/1685; H04L 5/0007; H04L 12/185; H04L 12/1863; H04L 12/189; H04B 7/0452; H04W 84/12
USPC .......................................................... 370/312
See application file for complete search history.

(56) References Cited

U.S. PATENT DOCUMENTS

| | | | |
|---|---|---|---|
| 2006/0195753 A1* | 8/2006 | Nam ...................... | H04L 1/1614 714/749 |
| 2006/0268886 A1* | 11/2006 | Sammour ............. | H04W 28/18 370/394 |
| 2009/0147734 A1* | 6/2009 | Naka ..................... | H04L 1/0026 370/329 |

(Continued)

*Primary Examiner* — Sai Ming Chan
(74) *Attorney, Agent, or Firm* — Sterne, Kessler, Goldstein & Fox P.L.L.C.

(57) ABSTRACT

A method for receiving feedback on a quality of multicast transmissions in a Wireless Local Access Network (WLAN) including a source electronic device (e.g., an access point) and a plurality of electronic devices is disclosed, according to some embodiments. The method can include (i) transmitting a plurality of multicast packets addressed to a subset of the plurality of electronic devices by the source electronic device; (ii) concurrently polling the subset of the plurality of electronic devices by the source electronic device; and (iii) receiving a plurality of block acknowledgements (BAs) from at least the subset of the plurality of electronic devices by the source electronic device. Each BA may include information on a quality of reception of two or more multicast packets received at an electronic device.

20 Claims, 9 Drawing Sheets

(56) References Cited

U.S. PATENT DOCUMENTS

| | | | | |
|---|---|---|---|---|
| 2011/0200130 A1* | 8/2011 | Choi | ................... | H04L 1/1614 |
| | | | | 375/260 |
| 2011/0268094 A1* | 11/2011 | Gong | ................... | H04L 1/1685 |
| | | | | 370/338 |
| 2013/0100952 A1* | 4/2013 | Hart | ................... | H04L 12/1868 |
| | | | | 370/390 |
| 2013/0188590 A1* | 7/2013 | Aiba | ................... | H04L 1/1861 |
| | | | | 370/329 |
| 2016/0270105 A1* | 9/2016 | Zhou | ................... | H04W 4/70 |
| 2016/0330007 A1* | 11/2016 | Cherian | ................ | H04L 5/0055 |
| 2017/0367077 A1* | 12/2017 | Shu | ................... | H04L 1/1854 |

* cited by examiner

MULTICAST RELIABILITY ENHANCEMENT

CROSS-REFERENCE TO RELATED APPLICATION

This application claims the benefit of U.S. Provisional Patent Application No. 62/153,287, filed Apr. 27, 2015, titled "Multicast Reliability Enhancement," which is hereby incorporated herein by reference in its entirety.

BACKGROUND

Field

The described embodiments relate to techniques for communicating information among electronic devices, including techniques for enhancing the reliability of wireless communication among electronic devices in a multicast group.

Related Art

One wireless communication technique for providing content to multiple electronic devices uses of a multicast group. For example, the content may be sent to electronic devices that are members of the multicast group (which are sometimes referred to as "sink electronic devices", "sink nodes", or "sinks") using a multicast transmission from an electronic device that is the source of multicast data (which is sometimes referred to as "source electronic device", "source node", or "source"). The source electronic device may be, for example, an access point ("AP") or a source node in an arbitrary source-sinks scenario.

This communication technique allows resources (required for performing actions such as content generation, processing, and communication) to be shared. This sharing can reduce the overall power consumption, and the air time required for communication in comparison to multiple unicast communications. The multicast transmission can use a communication technique compatible with an Institute of Electrical and Electronics Engineers (IEEE) 802.11 standard (which is sometimes referred to as 'Wi-Fi®').

However, there are multiple sources of inefficiency in current multicast mechanisms in wireless networks based on the IEEE 802.11 standard. In some legacy wireless communication networks based on the IEEE 802.11 standard, multicast transmissions sent by an AP and received at electronic devices in a multicast group do not benefit from any acknowledgement ("ACK") mechanism. That is, in response to receiving multicast packets from an AP, the electronic devices in the multicast group do not send ACK packets to the AP to provide feedback on whether the packet sent was correctly received. The ACK is used by the AP as a measure of the quality of service of multicast transmissions perceived by the electronic devices. Additionally, the data rate allowed for multicast transmissions is only limited to a standard "basic rate set", that is typically very low. For example, to send a physical layer convergence protocol data unit (PPDU) of 1500 KB size, only a 6 Mbps transmission rate is allowed (while other types of data can be transmitted at a 54 Mbps transmission rate), resulting in an air time of 2.02 milli-seconds (msec). Such a long required air time results in an inefficient airtime utilization that not only impacts the perceived Quality of Service ("QoS") of the electronic devices in the multicast group, but also the overall performance of the wireless network in which the electronic devices participate.

In some other legacy wireless communication networks based on the IEEE 802.11 standard, an AP converts a multicast transmission into multiple unicast transmissions. This conversion allows individual ACKs to be sent back from each electronic device in the multicast group to the AP.

In other legacy wireless communication networks based on the IEEE 802.11 standard, a GroupCast with Retries ("GCR") service is available. Based on GCR, the AP can retry multicast frames several times on its own discretion. The number of retries and the conditions based on which an AP attempts a multicast retry is typically implementation-specific.

In some other legacy wireless communication networks based on the 802.11 standard, GCR with block ACK ("BA") is available. A block ACK is similar to a regular ACK, except that it reports correct reception of multiple MAC packets at a time. Based on this mechanism, an AP may establish a BA agreement with some electronic devices. Following this agreement, after a multicast transmission, a random subset of electronic devices in the multicast group—from a subset of electronic devices that have a BA agreement with the AP—may receive polls to provide BAs. Acknowledgments are not received from all electronic devices in the multicast group. However, the electronic device(s) being polled in the existing GCR service may not reflect the reception status of the other electronic devices in the multicast group. For example, some electronic devices may have very poor reception quality while the polled electronic devices may report successful receipt of multicast data. The polled electronic devices may have a significant impact on the overall multicast experience across all the electronic devices in the multicast group. However, the access point can have difficulty selecting the correct set of electronic devices that represent the overall/worst reception quality of the multicast group.

Moreover, this communication technique is unable to address the different requirements of the electronic devices in the multicast group, such as different latencies, different numbers of sinks and/or different amounts of interference from other APs (which is sometimes referred to as "Overlapping Basic Service Sets" or "OBSS").

SUMMARY

In some embodiments, a method for receiving feedback on a quality of multicast transmissions in a Wireless Local Access Network (WLAN) including a source electronic device (e.g., an access point) and a plurality of electronic devices is disclosed. The method includes (i) transmitting a plurality of multicast packets addressed to a subset of the plurality of electronic devices by the source electronic device; (ii) concurrently polling the subset of the plurality of electronic devices by the source electronic device; and (iii) receiving a plurality of block acknowledgements (BAs) from at least the subset of the plurality of electronic devices by the source electronic device.

Each BA may include information on a quality of reception of two or more multicast packets received at an electronic device.

In some embodiments, the BAs are received serially from the subset of the plurality of electronic devices. In some embodiments, the source electronic device transmits a set-up frame to the electronic devices in the WLAN and specifies an order in which the subset of the plurality of electronic devices should transmit their respective BAs.

In some embodiments, a plurality of block acknowledgements (BAs) is received concurrently from the subset of the plurality of electronic devices. In some embodiments, the plurality of BAs are received concurrently via a plurality of Orthogonal Frequency-Division Multiple Access (OFDMA)

sub-channels. In some embodiments, the source electronic device may transmit a set-up frame to the electronic devices in the WLAN and specify the sub-channels in which the subset of the plurality of electronic devices should send their respective BAs.

In some embodiments, a plurality of block acknowledgements (BAs) is received concurrently from the plurality of electronic devices. In some embodiments, the plurality of BAs are received concurrently via a plurality of Multi-User Multiple Input Multiple Output (MU-MIMO) spatial streams. In some embodiments, the source electronic device may transmit a set-up frame to the electronic devices in the WLAN and specify the spatial streams in which the subset of the plurality of electronic devices should send their respective BAs.

In some embodiments, the source electronic device receives unsolicited BAs from electronic devices not in the subset of the plurality of the electronic devices that are polled. The unsolicited BAs may be received using enhanced distributed channel access (EDCA).

In some embodiments, a source electronic device is disclosed that includes a transceiver, and a processing subsystem coupled to the transceiver. In some embodiments, the processing subsystem is configured to (i) transmit a plurality of multicast packets addressed to a plurality of electronic devices in a WLAN; (ii) concurrently poll a plurality of electronic devices in the WLAN; (iii) and receive a plurality of block acknowledgements (BAs) from the plurality of electronic devices. In some embodiments, each BA may include information on quality of reception of at least two of the plurality of multicast packets at a second electronic device in the plurality of electronic devices. The BAs may be received serially from the plurality of electronic devices. In some embodiments, the source electronic device may transmit a set-up frame to the plurality of electronic devices. The set-up frame may include information that specifies an order in which the plurality of electronic devices should transmit their respective BAs.

In some embodiments, a source electronic device is disclosed that comprises a transceiver, and a processing subsystem coupled to the transceiver. In some embodiments, the processing subsystem is configured to (i) transmit a plurality of multicast packets addressed to a plurality of electronic devices in a WLAN; (ii) concurrently poll the plurality of electronic devices in the WLAN; and (iii) concurrently receive a plurality of BAs from the plurality of electronic devices. Each BA comprises information on quality of reception of at least two of the plurality of multicast packets at a second electronic device in the plurality of electronic devices.

In some embodiments, the plurality of BAs are received from the plurality of electronic devices using a plurality of OFDMA sub-channels. In some embodiments, the processing element may be further configured to transmit a set-up frame comprising information specifying OFDMA sub-channels in which the plurality of electronic devices should transmit BAs.

In some embodiments, the plurality of BAs are received from the plurality of electronic devices using a plurality of MU-MIMO sub-channels. In some embodiments, the processing element is further configured to transmit a set-up frame including information specifying MIMO spatial streams in which the plurality of electronic devices should transmit BAs.

In some embodiments, the source electronic device is configured to receive an unsolicited BA from an electronic device in the WLAN not in the plurality of electronic devices polled by the source electronic device. The unsolicited BA may be received using enhanced distributed channel access (EDCA).

In some embodiments, a non-transitory computer-readable storage medium is disclosed that contains instructions that, when executed by a processing subsystem in a source electronic device such as an access point, cause the source electronic device to perform operations for receiving multicast feedback information at the source electronic device. In some embodiments, these operations include: (i) transmitting a plurality of multicast packets addressed to a plurality of electronic devices in a WLAN; (ii) concurrently polling the plurality of electronic devices and (iii) receiving a plurality of BAs from the plurality of electronic devices. The BA may include information on quality of reception of at least two of the plurality of multicast packets at an electronic device in the plurality of electronic devices. In some embodiments, the BAs are received concurrently from the plurality of electronic devices. In some embodiments, the BAs are received serially from the plurality of electronic devices. In some embodiments, the BAs are concurrently received via a plurality of OFDMA sub-channels. In some embodiments, the non-transitory computer-readable storage medium further includes instructions that when executed by a processing subsystem cause a transmission subsystem to transmit a set-up frame comprising information specifying OFDMA sub-channels in which the plurality of electronic devices should transmit BAs.

In some embodiments, the BAs are concurrently received via a plurality of MIMO spatial streams. In some embodiments, the non-transitory computer-readable storage medium further includes instructions that when executed by a processing subsystem cause a transceiver to transmit a set-up frame comprising information specifying MIMO spatial streams in which the plurality of electronic devices should transmit BAs.

In some embodiments, the non-transitory computer-readable storage medium further comprises instructions that when executed by a processing subsystem cause the transceiver subsystem to receive unsolicited BAs from electronic devices not polled by the source electronic device. These unsolicited BAs may be transmitted by the electronic devices using enhanced distributed channel access (EDCA).

The preceding summary is provided for purposes of summarizing some embodiments to provide a basic understanding of aspects of the subject matter described herein. Accordingly, the above-described features are only examples and should not be construed as narrowing the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The accompanying drawings are incorporated herein and form a part of the specification.

The drawing in which an element first appears is typically indicated by the leftmost digit or digits in the corresponding reference number. In the drawings, like reference numbers may indicate identical or functionally similar elements.

DETAILED DESCRIPTION

Provided herein are system, method, and/or computer program product embodiments, and/or combinations and sub-combinations thereof, for providing—e.g., encoding, transmitting, receiving, and decoding—reliable multicast transmissions.

In general, the information communicated between the electronic devices in the disclosed embodiments may be conveyed in packets or frames that are transmitted and received by radios in the electronic devices in accordance with a communication protocol such as an Institute of Electrical and Electronics Engineers (IEEE) 802.11 standard (Wi-Fi), Bluetooth® (from the Bluetooth Special Interest Group of Kirkland, Wash.), a cellular-telephone communication protocol, and/or another type of wireless interface (such as a peer-to-peer communication technique. In the discussion that follows, Wi-Fi is used as illustrative examples.

In some embodiments, reliable multicast transmissions are accomplished by allowing the electronic devices to send feedback more proactively and more efficiently. Note that the multicast communication systems and methods disclosed herein may be used in a wide variety of communication techniques (such as IEEE 802.11ax), including communication between or among an electronic device and an access point and/or an arbitrary source-sinks scenario (such as, for example, between a laptop and a display in a peer-to-peer communication).

Figure 1:
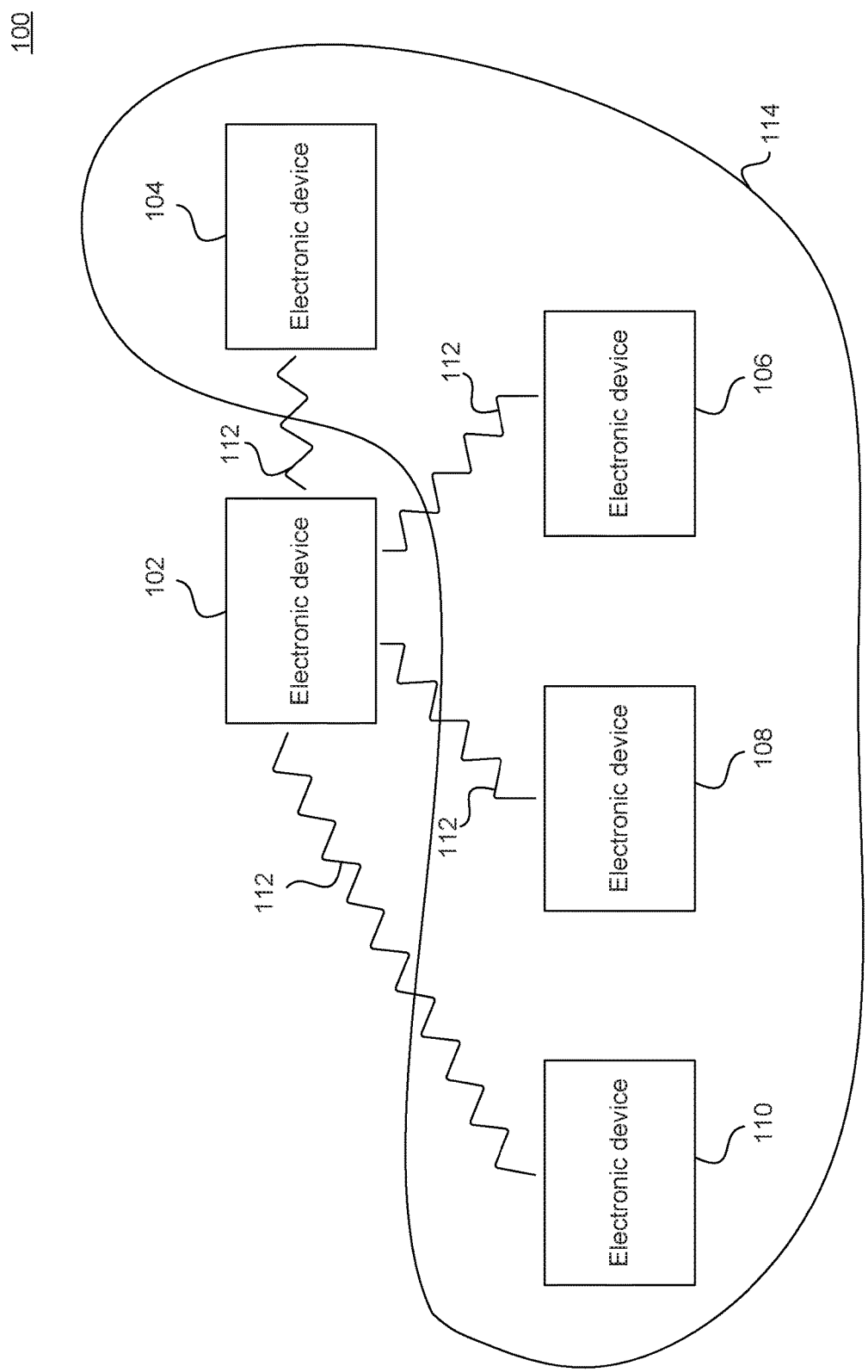
FIG. 1 is an example diagram of a wireless multicasting environment, according to some embodiments.

FIG. 1 is an example diagram of a wireless multicasting environment 100, according to some embodiments. Wireless multicasting environment 100 includes a source electronic device 102 and (sink) electronic devices 104, 106, 108, and 110. Source electronic device 102 may be an access point in a wireless local access network (WLAN) or a source device in another source-sink scenario (e.g., in peer-to-peer communication applications). Source electronic device 102 multicasts packets to members of multicast group 114, including electronic devices 104, 106, 108, and 110. The communication between source electronic device 102 and the devices in multicast group 114 takes place using wireless communication 112. The multicast packets may be data link layer (sometimes referred to as "MAC-layer" which is layer-2 in the OSI model of computer networking) packets. Wireless communication 112 may follow a wide variety of wireless communication techniques. In some embodiments, wireless communication channel 112 follows a standard WLAN technique such as IEEE 802.11. In an example according to some embodiments, electronic devices 102-110 in wireless multicasting environment 100 follow IEEE 802.11ax standard to communicate with each other.

In the described embodiments, receiving a packet or frame by an electronic device comprises receiving wireless signals encoding the packet or frame, decoding/extracting the packet or frame from received wireless signals to acquire the packet or frame, and processing the packet or frame to determine information contained in the packet or frame (such as data in the header and/or payload of the packet of frame).

Although we describe the network environment shown in FIG. 1 as an example, in alternative embodiments, different numbers or types of electronic devices may be present. For example, some embodiments comprise more or fewer electronic devices. As another example, in some embodiment, different electronic devices can be transmitting and/or receiving packets or frames.

Figure 2:
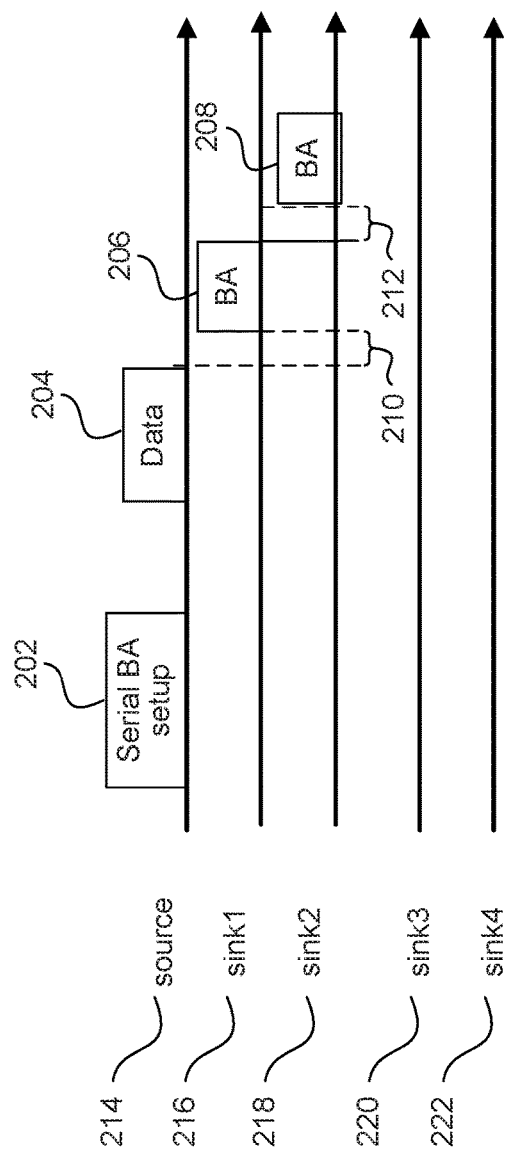
FIG. 2 is an example timing diagram for sending serialized block acknowledgements, according to some embodiments.

FIG. 2 is an example timing diagram 200 for sending serialized BAs, according to some embodiments.

In some embodiments, instead of polling each sink electronic device individually, the source (such as electronic device 102 in FIG. 1) may poll multiple electronic devices (such as electronic devices 104-110 in FIG. 1) in a multicast group (such as multicast group 114 in FIG. 1) at the same time in order to minimize overhead. Furthermore, subsequent to receiving a multicast packet, such as multicast data packet 204, from source 214, sink electronic devices 216 and 218 in the multicast group can send serialized multicast BAs, such as BA 206 and BA 208. According to some embodiments, BAs are returned in a serial manner. Packets may be transmitted serially (without using OFDMA and/or without using MU-MIMO). Rather, in some embodiments, the order of the serial BAs may be set-up in advance, using setup announcement in a setup frame such as serial BA set-up packet 202. Additionally or alternatively, the order of the serial BAs may be set-up in advance in a data-frame preamble. Two adjacent serial BAs may be separated by Short Inter-frame Space (SIFS), such as SIFS 212 to comply with the requirements of the IEEE 802.11 standard. Additionally, the first serial BA (e.g., BA 206) may also be separated from multicast data packet 204 by SIFS, such as SIFS 210. The number of serial BAs transmitted to the source electronic device may be required to be smaller than a pre-determined number to avoid scenarios where one missed BA results in a time gap longer than SIFS where the access medium is idle. In these scenarios, another electronic device in the WLAN may sense the idle state of the access medium, and grab the access medium for transmission of a packet. In this scenario, the remaining serialized BAs may encounter collisions when transmitted.

Figure 3:
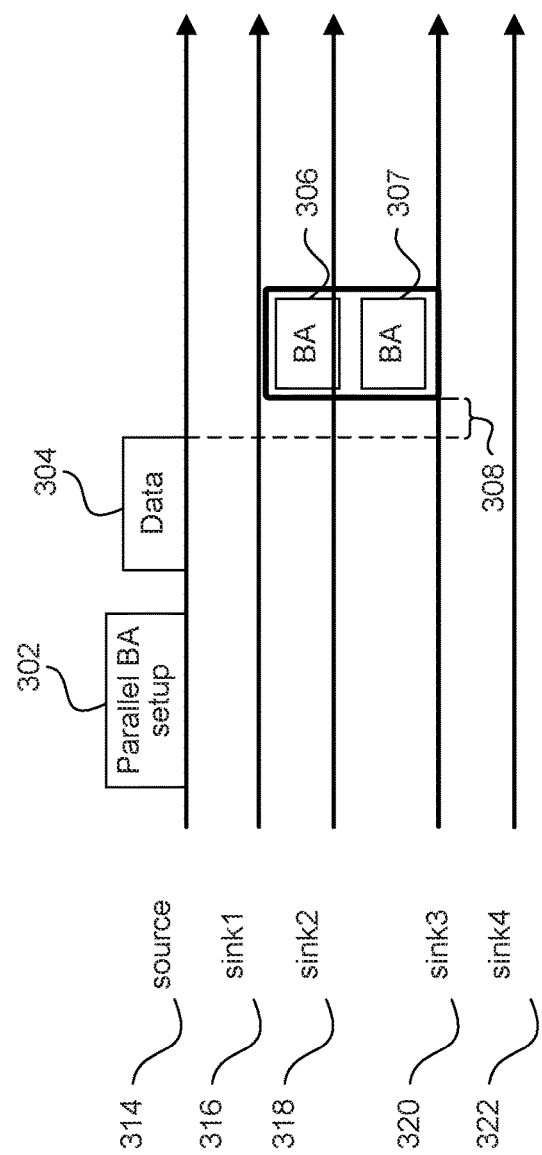
FIG. 3 is an example timing diagram for sending parallelized block acknowledgements, according to some embodiments.

FIG. 3 is an example timing diagram 300 for transmitting parallelized BAs, according to some embodiments.

In some embodiments, a communication technique used may include parallel multicast block acknowledgments such as BA 306 and BA 307. That is, subsequent to sending a multicast packet (such as data packet 304) by a source electronic device 314 (such as electronic device 102 in FIG. 1), instead of polling each electronic device (such as electronic devices 104-110 in FIG. 1) in a multicast group (such as multicast group 114 in FIG. 1) individually, source 314 may poll multiple electronic devices at the same time to minimize overhead. In response to the poll, sink electronic devices 318 and 320 in the multicast group may transmit BAs, such as BAs 306 and 307 to source electronic device 314 simultaneously and in a parallel manner. The simultaneous transmission of BA by multiple sink electronic devices may be through different OFDMA sub-channels and/or through different MU-MIMO streams. The sub-channel and/or spatial stream assignments in the parallel BAs may be set-up in advance using a setup announcement in a setup frame, such as parallel BA setup frame 302. Additionally or alternatively, the sub-channel and/or spatial stream assignments in the parallel BAs may be set-up in advance using a data-frame preamble. A parallel block acknowledgement may also be separated from data packets by SIFS, such as SIFS 308.

Figure 4:
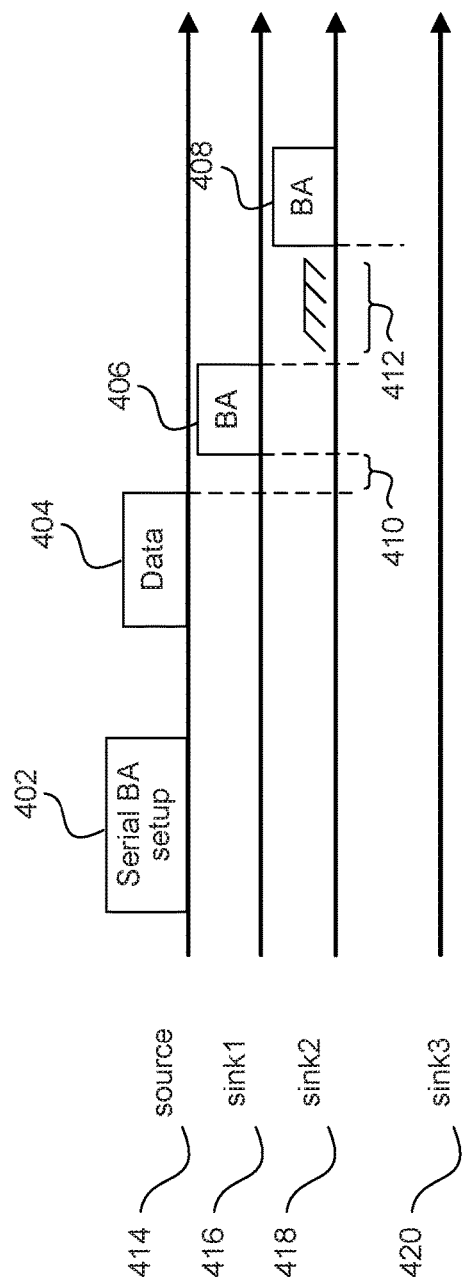
FIG. 4 is an example timing diagram for sending unsolicited block acknowledgements, according to some embodiments.

FIG. 4 is an example timing diagram for sending unsolicited BAs, according to some embodiments.

In some embodiments, the BAs, such as BA 408, may be unsolicited. That is, in response to receiving multicast data packets, such as data packet 404, a sink electronic device 418 (such as any of electronic devices 104-110 in FIG. 1) may transmit BA 408 to a source electronic device 414 (such as electronic device 102 in FIG. 1) without having previously received a poll from source electronic device 414. Because the BA can be unsolicited, collisions may occur. Consequently, a sink electronic device providing an unsolicited BA may avoid collisions using a channel access technique, such as Carrier Sense Multiple Access with Collision Avoidance and Resolution using Priorities (CSMA/CARP), or Enhanced Distributed Channel Access (EDCA). In FIG. 4, BA 406 is a solicited BA (sink 416 is previously polled by source electronic device 414), while BA 408 is an unsolicited BA. As was described above with respect to FIG. 3, a solicited BA, such as BA 406 may be separated from data packet 404 for an SIFS amount of time, such as SIFS 410. However, unsolicited BA 408 may have to follow EDCA to access the wireless medium, as shown in time-gap 412. In some embodiments, unsolicited BA packets may receive higher priority than other types of traffic. For example, BAs can receive higher priority than regular MAC traffic by using a smaller arbitration inter-frame space ("AD'S"), or a smaller contention window (CW).

In some embodiments, because the BA may be intended for fast feedback and retry at a media access control (MAC) layer, the unsolicited BA, such as BA 408, is sent substantially immediately after the received data, such as data packet 404. Otherwise, the BA may not be useful for the source-retry attempt because the source may have already moved out of the sequence-number window to which the data packet corresponds.

Figure 5:
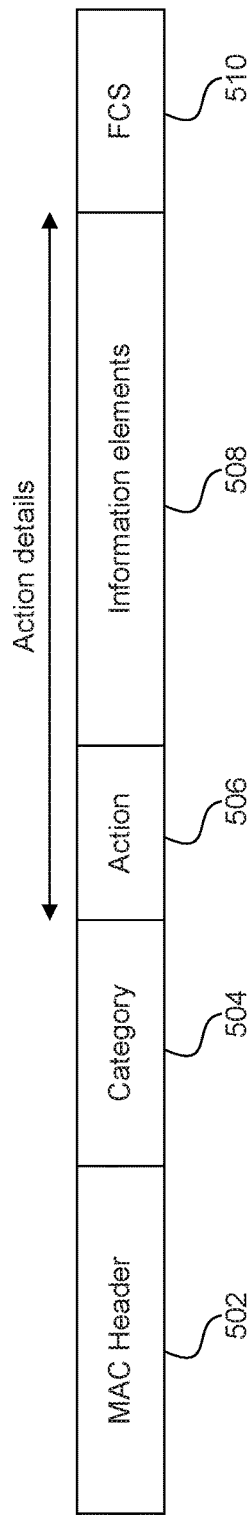
FIG. 5 is a block diagram for an example MAC frame that carries long-term feedback information on the reception quality of multicast packets at a sink electronic device in a long-term feedback scheme, according to some embodiments.

FIG. 5 is a block diagram for an example MAC management frame 500 that carries long-term feedback information on the reception quality of multicast packets at a sink electronic device in a long-term feedback scheme, according to some embodiments.

In some embodiments, a long-term feedback mechanism is used to provide feedback to a source electronic device (e.g., an access point, a printer, a thermostat, or a 'soft' access point), such as source electronic device 102 (in FIG. 1), on the quality of received multicast packets. In particular, a sink electronic device, such as electronic device 104-110, may collect or aggregate reception quality across multiple packets and report statistics to the source electronic device in a MAC frame. The feedback information may be included in different types of MAC frames, e.g., management, control, and/or data frames.

The long-term feedback information on the quality of multicast transmissions provided to the source electronic device may include information such as: a frame-check-sequence (FCS) error ratio, which may be defined as the number of FCS error events to the number of successful FCS events during a time interval; and/or a received MAC goodput, which may be defined as the number of bits (excluding duplicates) passed to upper layer to the duration of a time interval.

In FIG. 5, MAC management frame 500 is used by the sink electronic devices to report the feedback information to the source electronic device. However, a person of ordinary skill in the art would appreciate that other types of MAC frames may additionally or alternatively be used to carry multicast reception quality feedback information from the sink electronic device to the source electronic device in a long-term feedback scheme, without departing from the scope of the disclosure.

A MAC management frame is a type of MAC frame that allows for maintenance of communication between a source electronic device and one or more sink electronic devices. A MAC management frame compliant with the IEEE 802.11 may be of a variety of subtypes that include for example: an authentication frame (used by a sink electronic device to provide its identity information to the source electronic device); association request frame (used by the sink electronic device to request from the source electronic device allocation of resources); beacon frame (sent periodically from a source electronic device to announce its presence and provide service set identification (SSID) and other types of information); and action frame (used to send information to sink electronic devices in a WLAN, when sending in a beacon is not possible/suitable).

In FIG. 5, the long-term feedback information is included in a MAC management frame 500 with a subtype of an action frame. As can be seen in FIG. 5, in a MAC management frame 500 with a subtype of an action frame, after MAC header 502, details of the action frame follow. These details include fields such as category 504, action 506, and one or more information elements 508. MAC management frame is also protected by a few bits of frame check sequence (FCS) 510.

Category field 504 includes information about the type of the action frame (e.g., spectrum management, block acknowledgement, radio measurements, etc.). To include a category of action frames containing the long-term feedback for multicast packets, a new category may be added to the categories currently defined for action frames. In action field 506, a subcategory of the category indicated in category field 504 is specified. For example, for a radio measurement action frame, various types such as radio measurement request, radio measurement report, neighbor report request, etc. may be specified. Information elements 508 include details about the action. In some embodiments, a new action type may be defined for a new category indicated in category field 504 of action frames that is to carry long-term feedback information about the quality of multicast transmissions. Information elements 508 may be replaced by new fields that contain the long-term feedback information. Alternatively, a new information element may be defined for the long-term feedback information. As mentioned previously, the long-term feedback information may instead be included in MAC frames of other types such as data or control frames instead.

In some embodiments, the long-term feedback information is included in MAC management frame 500 with a subtype of action frame. However, a person of ordinary skill in the art would appreciate that other types of MAC frames or other subtypes of MAC management frames may additionally or alternatively be used without departing from the scope of the disclosure.

In addition or in alternative to the feedback methods described with respect to FIGS. 2-4, an application layer protocol such as a modified RTP control protocol (RTCP) and/or modified Real Time Streaming Protocol (RTSP), may be used to transmit feedback information to a source electronic device, such as electronic device 102, on the reception quality of multicast packets at a sink electronic device, such as electronic device 104-110, according to some embodiments.

RTCP is a protocol auxiliary to the Real-time Transport Protocol (RTP). RTCP provides out-of-band statistics and control information for an RTP session. It partners with RTP in the delivery and packaging of multimedia data but does not transport any media data. A primary function of RTCP is to provide feedback on the quality of service (QoS) of media distribution by periodically sending statistical information to electronic devices participating in a streaming multimedia session.

In some embodiments, a long-term feedback mechanism is used to provide feedback to the source electronic device on the quality of received multicast packets. In particular, the sink electronic devices may collect or aggregate reception quality across multiple packets and report statistics to the source electronic device.

The above long-term feedback mechanism is implemented at the application layer. For example, if the application is a peer-to-peer communication application, then an RTCP message can be modified to report the reception quality of multicast packets to the source electronic device. In this example, an RTCP Receive Report (RR) packet may be modified in a field such as "profile-specific extensions field" to provide the long-term feedback information.

Additionally or alternatively, a RTSP message may be used to provide long-term feedback information on the quality of reception of multicast packets at one or more of the sink electronic devices. RTSP is a network control protocol designed for use in entertainment and communications systems to control streaming media servers. This protocol is used for establishing and controlling media sessions between end points. The transmission of streaming data is not a task of RTSP. Many RTSP servers use RTP in conjunction with RTCP for media stream delivery.

In some embodiments, the GET PARAMETER or SET PARAMETER field within an RTSP message may be used to define the type of content (i.e., the above long-term feedback information) that is included in the RTSP packet. In these embodiments, instead of using a unicast stream to provide the RTSP feedback, the long-term feedback mechanism modifies the use and content of RTSP feedback to provide multicast feedback.

The long-term feedback information on the quality of multicast transmissions contained in an RTCP or RTSP packet may include information such as: a stream identification or traffic identification of a multicast stream or packet; a frame-check-sequence (FCS) error ratio, which may be defined as the number of FCS error events to the number of successful FCS events during a time interval; received MAC throughput; and/or a received MAC goodput, which may be defined as the number of bits (excluding duplicates) passed to upper layer to the duration of a time interval.

In some embodiments associated with FIGS. 2-5, after receiving the feedback message, a source electronic device, such as electronic device 102, can perform a remedial action based on the content of the feedback message. For example, the source electronic device may change the transmission data rate (e.g., to reduce the traffic load and therefore improve channel quality) by changing a modulation scheme, or modify a coding scheme applied to the transmitted multicast data. For example, in response to receiving feedback indicating that the multicast transmissions were poorly received by one or more sink electronic devices (e.g., electronic device 104-110) in a multicast group (e.g., multicast group 114), the source electronic device may use a more conservative modulation-coding scheme (MCS). Alternatively, the source electronic device may use a less conservative MCS in response to determining that the multicast transmissions were successfully received by the sink electronic devices in the multicast group.

Figure 6:
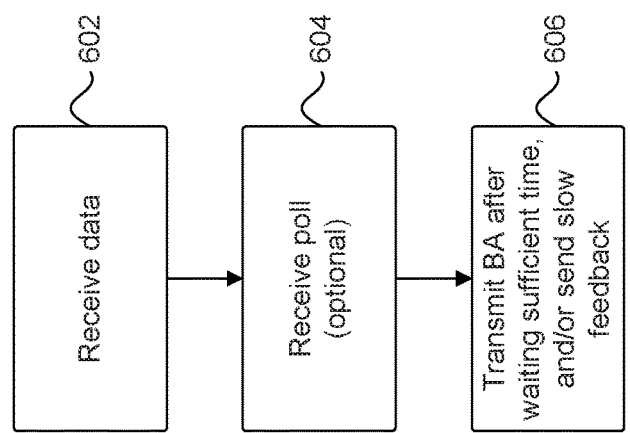
FIG. 6 is a flowchart for a method to provide block acknowledgements at a sink electronic device that is a member of a multicast group, according to some embodiments.

FIG. 6 is a flowchart for a method 600 to provide block acknowledgements at a sink electronic device that is a member of a multicast group, according to some embodiments.

In 602, a sink electronic device (such as electronic device 104-110) that is a member of a multicast group (such as multicast group 114) receives one or more data packets from a source electronic device (such as electronic device 102, that could be, e.g., an AP). Each of the received data packets may be an aggregate MAC protocol data unit (MPDU).

In 604, the sink electronic device receives a poll from the source electronic device to provide feedback on the QoS of the multicast data packet(s) the sink electronic device receives. Alternatively, in some embodiments, this operation may be skipped when unsolicited feedback is allowed, such as unsolicited block acknowledgements described with respect to FIG. 4.

In 606, the sink electronic device sends a feedback to the source electronic device informing the quality of reception of the multicast data packet(s).

In some embodiments short-term feedback is provided to the source electronic device. That is, the feedback is provided as block acknowledgement to every aggregate MPDU received. In some embodiments, after receiving an aggregate MPDU, the sink electronic device waits a 'sufficient' amount of time before sending the BA. This sufficient amount of time may be an SIFS in case of a solicited BA and is determined according to EDCA in case of an unsolicited BA.

In some embodiments, long-term feedback is transmitted to the source electronic device. That is, the sink electronic device transmits feedback information on the quality of multiple data packets (e.g., multiple aggregate MPDUs) received at the sink electronic device in one frame. This long-term feedback may be transmitted in the form of a Multicast feedback MAC frame as described with respect to FIG. 5 or an application layer frame such as an RTCP or RTSP frame.

Figure 7:
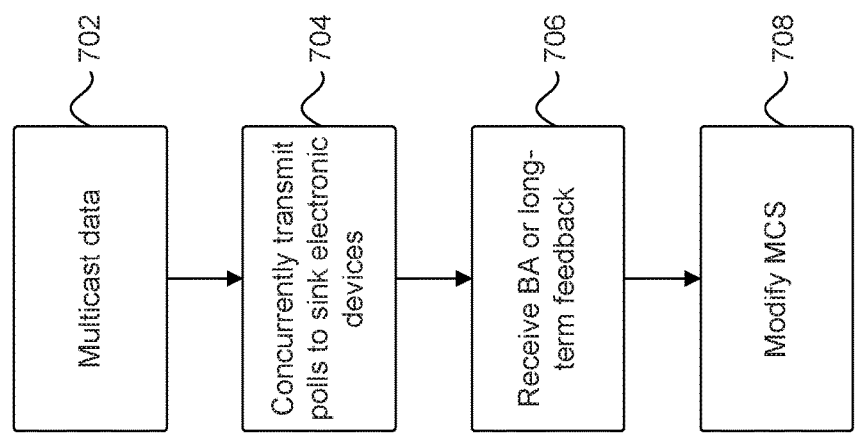
FIG. 7 is a flowchart for a method to receive feedback on the quality of multicast transmissions at a source electronic device, according to some embodiments.

FIG. 7 is a flowchart for a method 700 to receive feedback on the quality of multicast transmissions at a source electronic device, according to some embodiments.

In 702, a source electronic device (such as electronic device 102) transmits multicast data to sink electronic devices that are members of a multicast group (such as electronic devices 104-110).

In 704, the source electronic device concurrently transmits one or more polls (thereby minimizing overhead of polls) to all or a subset of the sink electronic devices in the multicast group to receive feedback information on the quality of reception of multicast transmissions at all or a subset of the sink electronic devices.

In 706, the source electronic device receives feedback from one or more sink electronic devices in the multicast group.

In some embodiments, the feedback information provided by the sink electronic devices in the multicast group are block acknowledgements transmitted by the sink electronic devices in a serial manner, as was described with respect to FIG. 2 above.

In some embodiments, the feedback information provided by multiple sink electronic devices in the multicast group are block acknowledgements that are parallelized and transmitted concurrently using multiple sub-channels in OFDMA or multiple spatial streams in MU-MIMO.

In some embodiments, feedback from one or more of the sink electronic devices in the multicast group may be transmitted to the source electronic device unsolicited, i.e., without those electronic devices being polled by the source electronic device, as described with respect to FIG. 4 above.

In some embodiments, long-term feedback is received by the source electronic device. That is, the source electronic device receives feedback information on the quality of multiple data packets (e.g., multiple aggregate MPDUs) received at one or more of the sink electronic devices in one frame. This long-term feedback may be received in the form of a multicast feedback MAC frame as described with respect to FIG. 5 or an application layer frame such as an RTCP or RTSP frame.

In 708, the source electronic device takes remedial actions in response to receiving feedback from one or more electronic devices in the multicast group. For example, the source electronic device may change the transmission data rate by changing the modulation scheme, or modify the coding scheme applied to the transmitted multicast data. Specifically, the source electronic device may use a more conservative modulation-coding scheme (MCS) in response to determining that the multicast transmissions were poorly received by one or more of the sink electronic devices in the multicast group. A more conservative MCS includes a modulation scheme. Alternatively, the source electronic device may use a less conservative MCS in response to determining that the multicast transmissions were successfully received by all of most of the sink electronic devices in the multicast group. For example, the IEEE 802.11 standard can use one of ten MCSs—often referred to as "MCS0" to "MCS9"—with MCS0 being the most conservative scheme. For the same signal to noise ratio (SNR), an error rate in decoding a packet encoded using an MCS with a higher index value is often greater than that of a packet encoded using an MCS with a smaller index value. Therefore, in some embodiments, after determining poor multicast transmissions quality, the MCS applied for encoding the multicast packets is selected to be more conservative—e.g., having a lower MCS index—to further protect the data integrity of the transmitted multicast packets and to ensure their correct detection.

Figure 8:
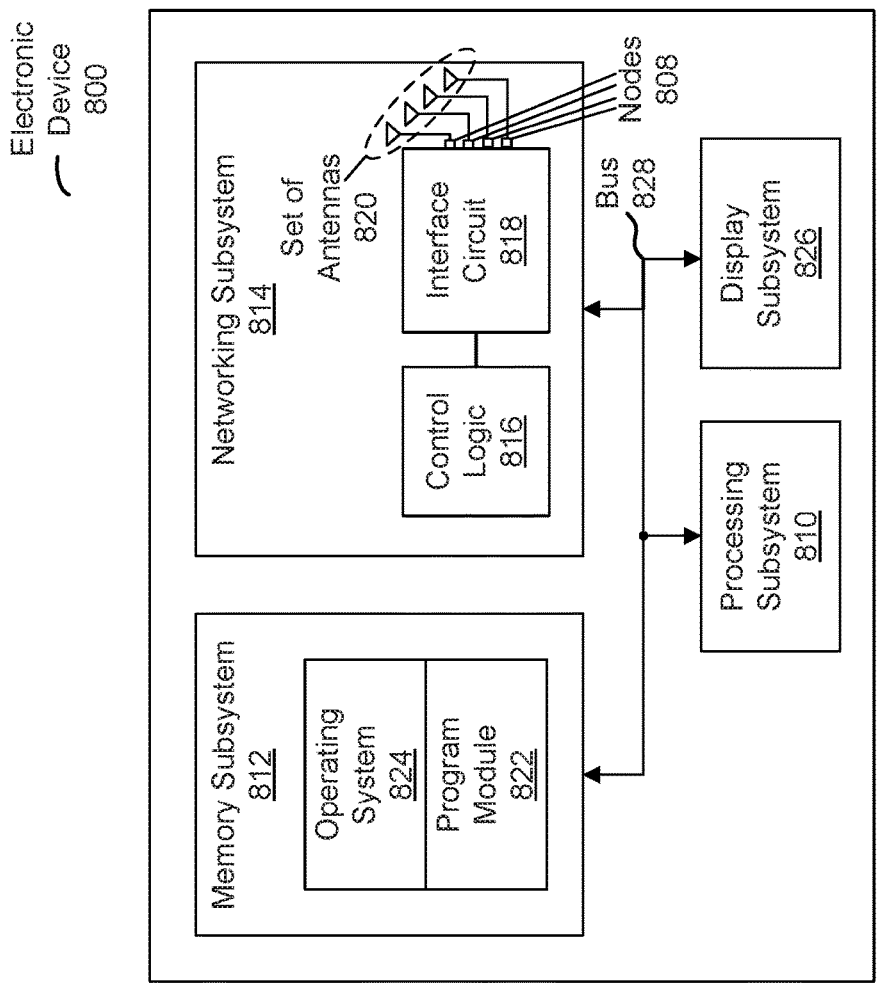
FIG. 8 is a block diagram illustrating an electronic device 200 in accordance with some embodiments.

FIG. 8 presents a block diagram illustrating an electronic device 800 (such as electronic device 102, 104, 106, 108, and 110), such as an access point or an electronic device in a WLAN, in accordance with some embodiments. Electronic device 800 includes processing subsystem 810, memory subsystem 812, and networking subsystem 814. Processing subsystem 810 includes one or more devices configured to perform computational operations. For example, processing subsystem 810 can include one or more microprocessors, application-specific integrated circuits (ASICs), microcontrollers, programmable-logic devices, and/or one or more digital signal processors (DSPs).

Various embodiments can be implemented, for example, using one or more computer systems, such as electronic device 800 shown in FIG. 8. Computer system 800 can be used, for example, to implement method 600 of FIG. 6. For example, electronic device 800 may be configured to receive data (e.g., packets or frames), and polls from a second electronic device such as electronic device 102 in FIG. 1 (which may be sink electronic devices, e.g., an access point), and transmit BAs to the second electronic device after waiting a sufficient amount of time, such as SIFS, as previously described with respect to method 600 in FIG. 6. In another example, electronic device 800 can be used, for example, to implement method 700 of FIG. 7. For example, electronic device 800 can be configured to transmit multicast data to one or more electronic devices such as electronic devices 104-110 in FIG. 1 which may be sink electronic devices. Electronic device 800 can be further configured to concurrently transmit polls to the sink electronic devices, and receive BAs or other forms of feedback (such as long-term feedback) from the sink electronic devices. Electronic device 800 can be further configured to modify a modulation and/or coding scheme used to transmit multicast data in response to the feedback received from the sink electronic devices, as previously described with respect to method 700 in FIG. 7.

Memory subsystem 812 includes one or more devices for storing data and/or instructions for processing subsystem 810 and networking subsystem 814. For example, memory subsystem 812 can include dynamic random access memory (DRAM), static random access memory (SRAM), and/or other types of memory. In some embodiments, instructions for processing subsystem 810 in memory subsystem 812 include: one or more program modules or sets of instructions (such as program module 822 or operating system 824), which may be executed by processing subsystem 810. Note that the one or more computer programs may constitute a computer-program mechanism. Moreover, instructions in the various modules in memory subsystem 812 may be implemented in a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 810.

In addition, memory subsystem 812 can include mechanisms for controlling access to the memory. In some embodiments, memory subsystem 812 includes a memory hierarchy that includes one or more caches coupled to a memory in electronic device 800. In some embodiments, one or more of the caches is located in processing subsystem 810.

In some embodiments, memory subsystem 812 is coupled to one or more high-capacity mass-storage devices (not shown). For example, memory subsystem 812 can be coupled to a magnetic or optical drive, a solid-state drive, or another type of mass-storage device. In some embodiments, memory subsystem 812 can be used by electronic device 800 as fast-access storage for often-used data, while the mass-storage device is used to store less frequently used data.

Networking subsystem 814 includes one or more devices configured to couple to and communicate on a wired and/or wireless network (i.e., to perform network operations). Networking subsystem 814 includes a: control logic 816, an interface circuit 818, and a set of antennas 820 (or antenna elements) in an adaptive array that can be selectively turned on and/or off by control logic 816 to create a variety of optional antenna patterns or 'beam patterns.' In some embodiments, electronic device 800 includes one or more nodes, such as nodes 808, e.g., a pad, which can be coupled to set of antennas 820. Thus, electronic device 800 may or may not include set of antennas 820. Networking subsystem 814 can also include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 814 includes processors, controllers, radios/antennas, sockets/plugs, and/or other devices used for coupling to, communicating on, and handling data and events for each supported networking system. Mechanisms used for coupling to, communicating on, and handling data and events on the network for each network system are sometimes collectively referred to as a "network interface" for the network system. Moreover, in some embodiments a "network" or a "connection" between the electronic devices does not yet exist. Therefore, electronic device 800 may use the mechanisms in networking subsystem 814 using interface circuit 818 and antennas 820 for performing simple wireless communication between the electronic devices, e.g., transmitting advertising or beacon frames and/or scanning for advertising frames transmitted by other electronic devices as described previously.

Within electronic device 800, processing subsystem 810, memory subsystem 812, and networking subsystem 814 are coupled together using bus 828. Bus 828 may include an electrical, optical, and/or electro-optical connection that the subsystems can use to communicate commands and data among one another. Although only one bus 828 is shown for clarity, different embodiments can include a different number or configuration of electrical, optical, and/or electro-optical connections between the subsystems.

In some embodiments, electronic device 800 includes a display subsystem 826 for displaying information on a display, which may include a display driver and the display, such as a liquid-crystal display, a multi-touch touchscreen, etc.

Electronic device 800 can be (or can be included in) any electronic device with at least one network interface. For example, electronic device 800 can be (or can be included in) a desktop computer, a laptop computer, a subnotebook/netbook, a server, a tablet computer, a smartphone, a cellular telephone, a smart watch, a consumer-electronic device, a portable computing device, an access point, a router, a switch, communication equipment, test equipment, and/or another electronic device.

Although specific components are used to describe electronic device 800, in alternative embodiments, different components and/or subsystems may be present in electronic device 800. For example, electronic device 800 may include one or more additional processing subsystems, memory subsystems, networking subsystems, and/or display subsystems. Additionally, one or more of the subsystems may not be present in electronic device 800. Moreover, in some embodiments, electronic device 800 may include one or more additional subsystems that are not shown in FIG. 8. Also, although separate subsystems are shown in FIG. 8, in some embodiments some or all of a given subsystem or component can be integrated into one or more of the other subsystems or component(s) in electronic device 800. For example, in some embodiments, program module 822 is included in operating system 824 and/or control logic 816 is included in interface circuit 818.

Moreover, the circuits and components in electronic device 800 may be implemented using any combination of analog and/or digital circuitry, including bipolar, PMOS and/or NMOS gates or transistors. Additionally, components and circuits may be single-ended or differential, and power supplies may be unipolar or bipolar.

Figure 9:
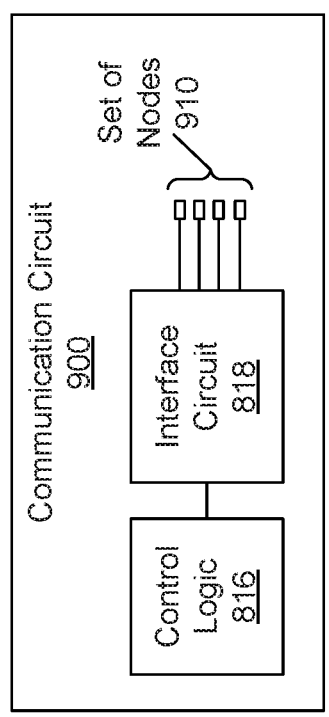
FIG. 9 is a block diagram of communication circuit 300 in accordance with some embodiments.

An integrated circuit (which is sometimes referred to as a "communication circuit") may implement some or all of the functionality of networking subsystem 814. This is illustrated in FIG. 9, which presents a block diagram of communication circuit 900 in accordance with some embodiments. In particular, communication circuit 200 may include control logic 816, an interface circuit 818, and a set of nodes 910 (such as pads) that can couple to set of antennas 820 (in FIG. 8).

Referring back to FIG. 8, the integrated circuit may include hardware and/or software mechanisms that are used for transmitting wireless signals from electronic device 800 and receiving signals at electronic device 800 from other electronic devices. Aside from the mechanisms herein described, radios are generally known in the art and hence are not described in detail. In general, networking subsystem 814 and/or the integrated circuit can include any number of radios. Note that the radios in multiple-radio embodiments function in a similar way to the described single-radio embodiments.

In some embodiments, networking subsystem 814 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. The term "monitoring" as used herein includes receiving signals from other electronic devices and possibly performing one or more processing operations on the received signals, e.g., determining if the received signal includes a control channel, calculating an optional beam pattern, etc.

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in Caltech Intermediate Format (CIF), Calma GDS II Stream Format (GDSII) or Electronic Design Interchange Format (EDIF). Those of skill in the art in integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used.

Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software, or both. For example, at least some of the operations in the communication technique may be implemented using program module 822, operating system 824 (such as a driver for interface circuit 818), or firmware in interface circuit 818. Alternatively or additionally, at least some of the operations in the communication technique may be implemented in a physical layer, such as hardware in interface circuit 818.

Identifiers, such as "(a)," "(b)," "(i)," "(ii)," etc., are sometimes used for different elements or steps. These identifiers are used for clarity and do not necessarily designate an order for the elements or steps.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the embodiments above reveals the general nature of the disclosure that others can, by applying knowledge within the skill of the art, readily modify and/or adapt for various applications such embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A method for receiving feedback on quality of multicast transmissions, the method comprising:
   transmitting, by a source electronic device, a set-up frame to a plurality of electronic devices, the set-up frame comprising information for a concurrent reception of a plurality of block acknowledgements (BAs), wherein the information for the concurrent reception comprises sub-channel assignment or spatial stream assignment;
   after transmitting the set-up frame, transmitting, by the source electronic device, a plurality of multicast packets to the plurality of electronic devices;
   concurrently polling a subset of the plurality of electronic devices;
   receiving, in parallel at the source electronic device, the plurality of BAs from at least the subset of the plurality of electronic devices, wherein each BA comprises information on quality of reception of at least one of the plurality of multicast packets at an electronic device in the subset of the plurality of electronic devices; and
   receiving, at the source electronic device, an unsolicited BA from an electronic device in the plurality of electronic devices and outside of the subset of the plurality of electronic devices,
   wherein the subset of the plurality of electronic devices comprises at least two electronic devices.

2. The method of claim 1, wherein the concurrently reception of the plurality of BAs comprises concurrently receiving the plurality of BAs via a plurality of orthogonal frequency-division multiple access (OFDMA) sub-channels or via a plurality of multi-user multiple input multiple output (MU-MIMO) spatial streams.

3. A method for receiving feedback on quality of multicast transmissions, the method comprising:
   transmitting, by a source electronic device, a set-up frame to a plurality of electronic devices, the set-up frame comprising information for a concurrent reception of a plurality of block acknowledgements (BAs), wherein the information for the concurrent reception comprises sub-channel assignment or spatial stream assignment;
   after transmitting the set-up frame, transmitting, by the source electronic device, a plurality of multicast packets in a Wireless Local Access Network (WLAN) comprising the source electronic device and the plurality of electronic devices;
   concurrently polling a subset of the plurality of electronic devices; and
   concurrently receiving, at the source electronic device, the plurality of BAs from at least the subset of the plurality of electronic devices, wherein each BA comprises information on quality of reception of at least one of the plurality of multicast packets at an electronic device in the subset of the plurality of electronic devices,
   wherein the subset of the plurality of electronic devices comprises at least two electronic devices.

4. The method of claim 3, wherein the concurrently receiving comprises concurrently receiving the plurality of BAs via a plurality of orthogonal frequency-division multiple access (OFDMA) sub-channels.

5. The method of claim 3, wherein the concurrently receiving comprises concurrently receiving the plurality of BAs via a plurality of multi-user multiple input multiple output (MU-MIMO) spatial streams.

6. The method of claim 4, wherein the sub-channel assignment comprises information assigning at least one sub-channel to the electronic device in the subset of the plurality of electronic devices to transmit a BA.

7. The method of claim 5, wherein the spatial stream assignment comprises information assigning at least one spatial stream to the electronic device in the subset of the plurality of electronic devices to transmit a BA.

8. The method of claim 3, further comprising:
   receiving, using enhanced distributed channel access (EDCA), an unsolicited BA from an electronic device in the plurality of electronic devices and outside of the subset of the plurality of electronic devices.

9. A source electronic device comprising:
   a transceiver; and
   a processing subsystem coupled to the transceiver and configured to:
   transmit a set-up frame to a plurality of electronic devices, the set-up frame comprising information for a concurrent reception of a plurality of block acknowledgements (BAs);

after transmitting the set-up frame, transmit a plurality of multicast packets in a Wireless Local Access Network (WLAN) comprising the plurality of electronic devices;

concurrently poll a subset of the plurality of electronic devices in the WLAN;

concurrently receive the plurality of BAs from at least the subset of the plurality of electronic devices, wherein each BA comprises information on quality of reception of at least one of the plurality of multicast packets at an electronic device in the subset of the plurality of electronic devices; and receive an unsolicited BA from an electronic device in the plurality of electronic devices and outside of the subset of the plurality of electronic devices, wherein the subset of the plurality of electronic devices comprises at least two electronic devices, wherein the info nation for the concurrent reception comprises information assigning at least one sub-channel to the electronic device in the subset of the plurality of electronic devices to transmit a BA or comprises infounation assigning at least one spatial stream to the electronic device in the subset of the plurality of electronic devices to transmit the BA.

10. The source electronic device of claim 9, wherein the processing subsystem is configured to concurrently receive the plurality of BAs via a plurality of orthogonal frequency-division multiple access (OFDMA) sub-channels or via a plurality of multi-user multiple input multiple output (MU-MIMO) spatial streams.

11. A source electronic device comprising:
a transceiver; and
a processing subsystem coupled to the transceiver and configured to:
transmit a set-up frame to a plurality of electronic devices, the set-up frame comprising information for a concurrent reception of a plurality of block acknowledgements (BAs), wherein the information for the concurrent reception comprises sub-channel assignment or spatial stream assignment;

after transmitting the set-up frame, transmit a plurality of multicast packets in a Wireless Local Access Network (WLAN) comprising the plurality of electronic devices;

concurrently poll a subset of the plurality of electronic devices in the WLAN; and receive the plurality of BAs from at least the subset of the plurality of electronic devices, wherein each BA comprises information on quality of reception of at least one of the plurality of multicast packets at an electronic device in the subset of the plurality of electronic devices, the information on quality of reception comprising a frame-check-sequence (FSC) error ratio, wherein the BAs are received concurrently from the subset of the plurality of electronic devices, and wherein the subset of the plurality of electronic devices comprises at least two electronic devices.

12. The source electronic device of claim 11, wherein the receiving the plurality of BAs comprises concurrently receiving the plurality of BAs via a plurality of Orthogonal Frequency-Division Multiple Access (OFDMA) sub-channels, and wherein the sub-channel assignment comprises information assigning at least one sub-channel to the electronic device in the subset of the plurality of electronic devices to transmit a BA.

13. The source electronic device of claim 11, wherein the receiving the plurality of BAs comprises concurrently receiving the plurality of BAs via a plurality of multi-user multiple input multiple output (MU-MIMO) spatial streams, and wherein the spatial stream assignment comprises information assigning at least one spatial stream to the electronic device in the subset of the plurality of electronic devices to transmit a BA.

14. The source electronic device of claim 11, the processing subsystem further configured to:
receive, using enhanced distributed channel access (EDCA), an unsolicited BA from an electronic device in the plurality of electronic devices and outside of the subset of the plurality of electronic devices.

15. A non-transitory computer-readable storage medium at a source electronic device, the non-transitory computer-readable storage medium including instructions that, when executed by a processing subsystem, causes a transceiver unit coupled to the non-transitory computer-readable storage medium to perform operations comprising:
transmitting, by the source electronic device, a plurality of multicast packets to a plurality of electronic devices;
concurrently polling a subset of the plurality of electronic devices; and
concurrently receiving, at the source electronic device, a plurality of block acknowledgements (BAs) from at least the subset of the plurality of electronic devices, wherein each BA comprises information on quality of reception of at least one of the plurality of multicast packets at an electronic device in the subset of the plurality of electronic devices,
wherein the information on quality of reception comprises a number of non-duplicate bits passed to a layer higher than a Media Access Control (MAC) layer over a time interval, and
wherein the subset of the plurality of electronic devices comprises at least two electronic devices.

16. The non-transitory computer-readable storage medium of claim 15, wherein the concurrently receiving comprises concurrently receiving the plurality of BAs via a plurality of orthogonal frequency-division multiple access (OFDMA) sub-channels, the operations further comprising:
prior to the transmitting the plurality of multicast packets, transmitting a set-up frame that comprises information assigning at least one sub-channel to the electronic device in the subset of the plurality of electronic devices to transmit a BA.

17. The non-transitory computer-readable storage medium of claim 15, wherein the concurrently receiving comprises concurrently receiving the plurality of BAs via a plurality of multi-user multiple input multiple output (MU-MIMO) spatial streams, the operations further comprising:
prior to the transmitting the plurality of multicast packets, transmitting a set-up frame that comprises information assigning at least one spatial stream to the electronic device in the subset of the plurality of electronic devices to transmit a BA.

18. The non-transitory computer-readable storage medium of claim 15, the operations further comprising:
receiving, using enhanced distributed channel access (EDCA), an unsolicited BA from an electronic device in the plurality of electronic devices and outside of the subset of the plurality of electronic devices.

19. The method of claim 1, wherein the information on quality of reception comprises a number of non-duplicate bits passed to a layer higher than a Media Access Control (MAC) layer over a time interval.

20. The method of claim 1, wherein the information on quality of reception comprises information on quality of reception across the plurality of multicast packets received at the electronic device in the plurality of electronic devices.

* * * * *